Aug. 23, 1927.
H. S. BERGEN
1,640,105
TAPPING MACHINE
Filed July 28, 1921
3 Sheets-Sheet 1
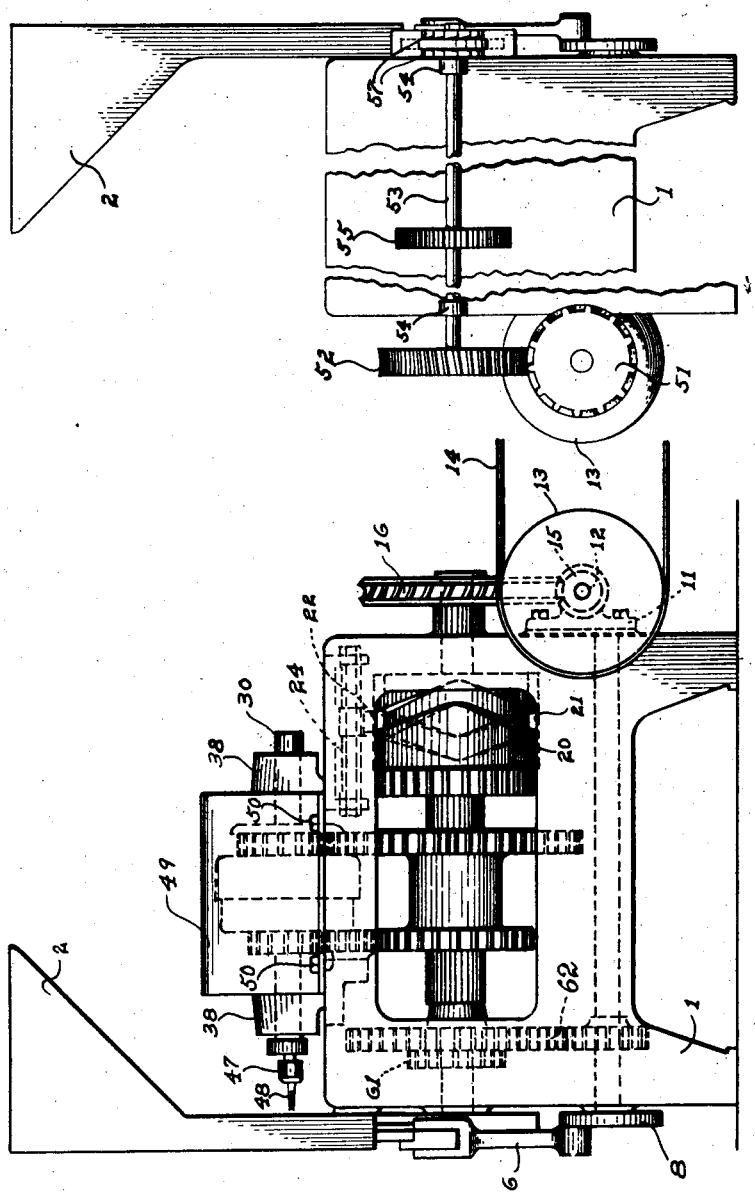
Inventor
HARRY S. BERGEN.
By C. D. Marshall
Attorney

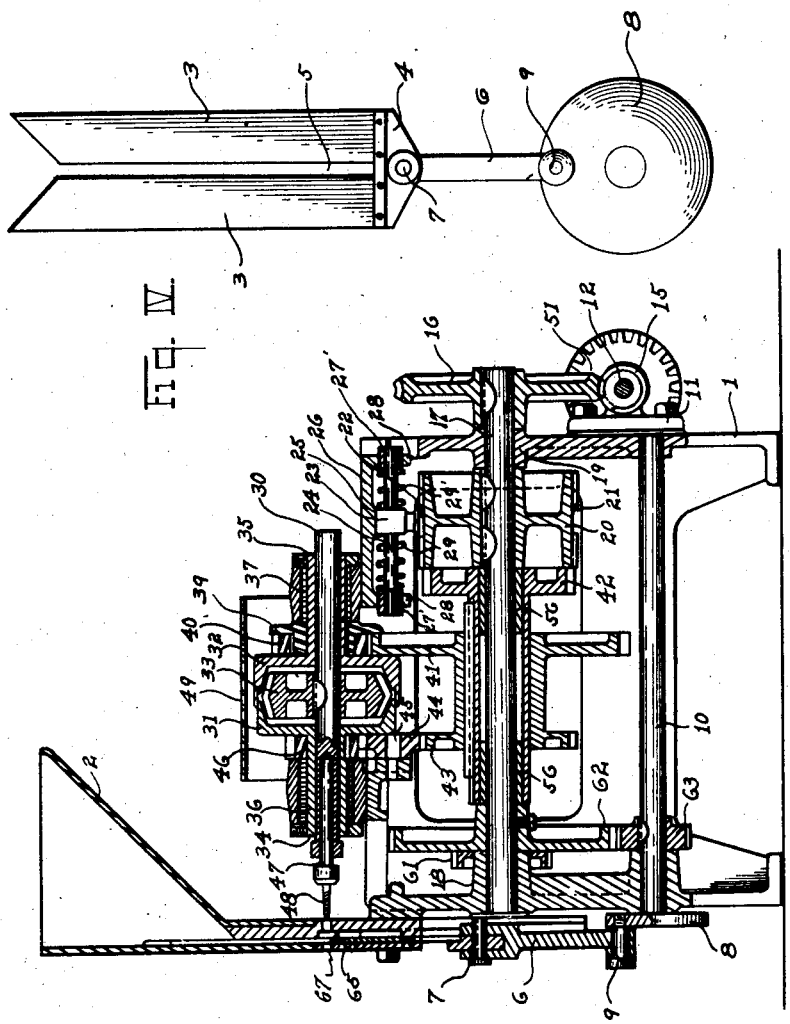

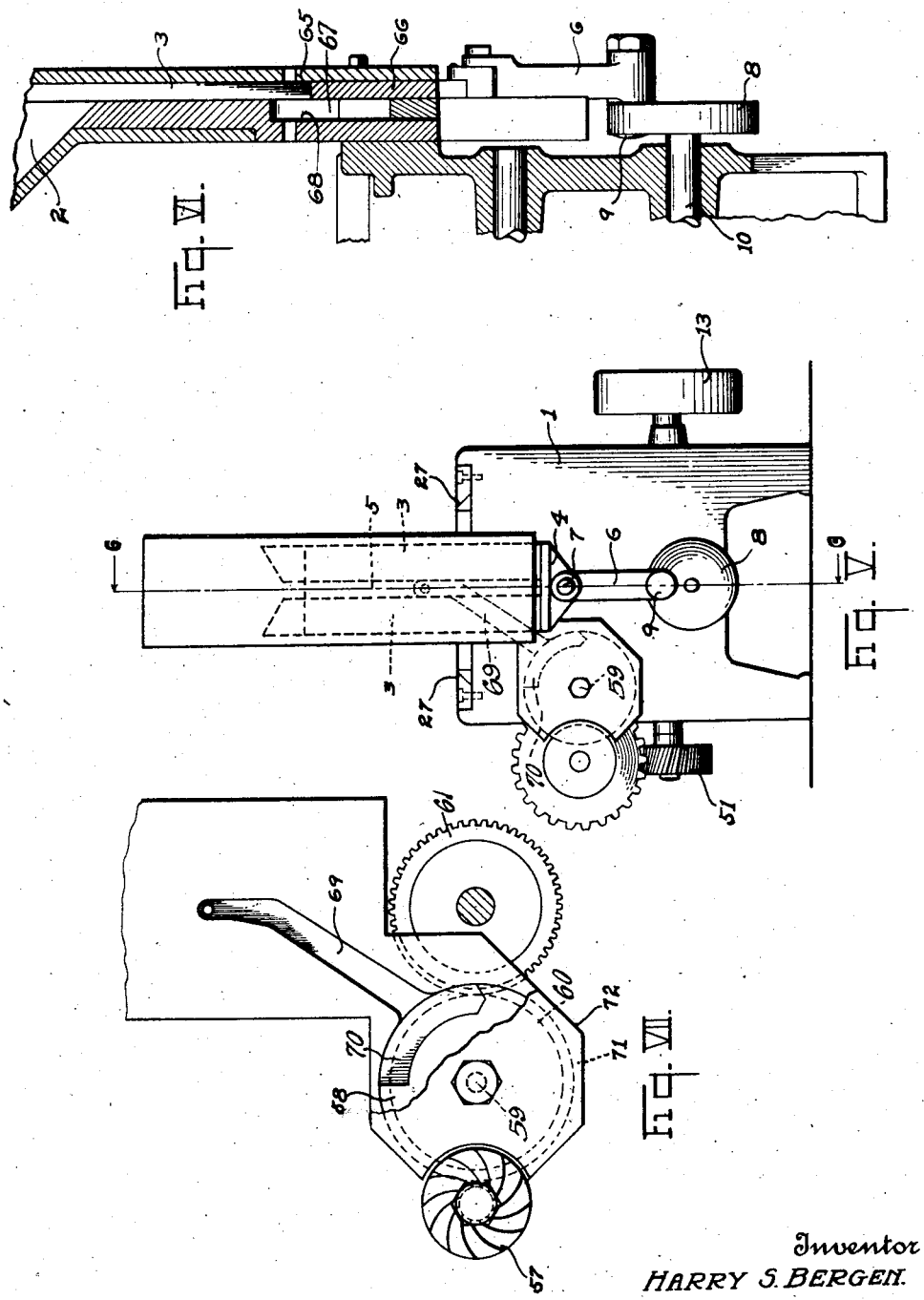

Patented Aug. 23, 1927.

1,640,105

UNITED STATES PATENT OFFICE.

HARRY S. BERGEN, OF TOLEDO, OHIO, ASSIGNOR TO TOLEDO SCALE COMPANY, OF TOLEDO, OHIO, A CORPORATION OF NEW JERSEY.

TAPPING MACHINE.

Application filed July 28, 1921. Serial No. 488,107.

This invention relates to machines for tapping or threading nuts or other apertured articles of regular size and shape, and is particularly adapted for use in re-tapping or re-threading nuts, the threads of which have become battered by use or have become clogged with rust or other matter.

One of the objects of the invention is the provision of improved means for selecting and feeding the nuts one by one from a supply in a hopper and successively bringing them into position to be threaded by a screw tap.

Another object is the provision of automatic mechanism for moving the threading tap into the nut and withdrawing it therefrom after the threading operation has been completed.

Another object is the provision of means for automatically removing the nut from the device in which it was held while being threaded and transferring it to a suitable receptacle after the threading taps have been withdrawn.

Another object is to provide means for removing the rough edges or burrs which appear during the threading operation.

Still another object is to provide a machine which is entirely automatic in its operation and of compact and fool-proof construction.

Other objects and advantages will be apparent from the following description, in which reference is had to the accompanying drawings illustrating a preferred embodiment of my invention and wherein similar reference numerals designate similar parts throughout the several views.

In the drawings:—
Figure 1 is a side elevational view of a nut tapping machine embodying my invention;
Figure 2 is a reverse side elevation of the machine, parts being broken out;
Figure 3 is a longitudinal vertical section through the machine;
Figure 4 is an enlarged detail view of the nut agitating and feeding device;
Figure 5 is an end elevation of the machine, the nut agitating device being shown in dotted lines;
Figure 6 is an enlarged fragmentary detail, partly in section, on the line 6—6 of Figure 5; and
Figure 7 is an enlarged fragmentary elevation, with parts broken away, showing the burr removing and discharging mechanism.

The working parts of my invention are mounted upon a frame 1 which is of shell-like construction so as to suitably house the parts contained therein. Rigidly mounted upon one end of the frame 1 is a hopper 2 having a substantially rectangular chute-like member extending downwardly from its lower end. The chute-like member slidably receives a pair of bars 3, the upper extremities of which are beveled inwardly to facilitate the entrance of the nuts into a vertical slot 5 which is formed by reason of the bars being spaced apart a distance substantially equal to the width of the nuts to be tapped. The lower ends of the spaced bars are secured to a transversely extending cross head 4 and a connecting rod 6 is pivotally attached to the cross head by means of a wrist pin 7, the lower end of the connecting rod being connected to a disk 8 by means of a crank pin 9. The disk 8 is fixed to a horizontal shaft 10 which extends longitudinally adjacent the bottom of the frame 1 so that when the shaft 10 is rotated a reciprocatory motion is imparted to the bars 3 through the medium of the connecting rod 6. This movement of the bars 3 agitates the contents of the hopper and causes the nuts contained therein to feed downwardly through the slot 5.

Mounted upon the opposite end of the frame 1 in journal brackets 11 is a laterally extending shaft 12 rigidly secured to one end of which is a pulley 13 adapted to be driven through the medium of the belt 14 from any suitable source of power (not shown). Positioned upon the shaft 12 so as to be rotatable therewith is a worm 15 which meshes with a worm wheel 16 keyed or otherwise fixedly secured to a horizontally extending shaft 17 which lies substantially in the longitudinal center of the frame 1. By employing this type of transmission the speed of the shaft 17 is greatly reduced as compared to the relatively high speed of the shaft 12.

The shaft 17 is journalled at each end of the frame, as at 18 and 19, and mounted thereon so as to rotate with the shaft is a grooved cylindrical cam 20 into the groove 21 of which projects a roller 22. The roller 22 is carried by a cubical block 23, the upper flat face of which slidably engages a downwardly turned flat face 25 on a member 26.

The engagement of these flat faces serves to prevent rotation of the shaft 24 to which the block 25 is fixed. The member 26 is slidably mounted upon the frame 1 in adjustable beveled ways 27. The shaft 24 is mounted at each end in adjustable bushings 27' positioned in downwardly depending bosses 28 of the slidable member 26, and intermediate the bushings 27' and the block 23 are positioned a pair of expansive springs 29, the expansive force of which may be varied by shifting the positions of the bushings 27' within the bosses 28. The bushings 27' may be secured within the bosses 28 by means of set screws so that they may be readily shifted when desired.

As the grooved cam 20 rotates the shaft 24 is shifted back and forth and this movement of the shaft is communicated through the springs 29 to the slide 26. Rotatably mounted in suitable bushings carried by the slide 26 is a pair of aligned hollow shafts 34 and 35, the adjacent ends of which are integral with clutch members 31 and 32, and rotatably mounted within the hollow shafts 34 and 35 is a shaft 30 carrying a bevel faced clutch member 33 which is splined to the shaft 30 intermediate the clutch members 31 and 32. The clutch members 31 and 32 have internal conical faces which may be selectively brought into frictional contact with the bevel faced clutch member 33 by means to be hereinafter described.

The hollow shafts 34 and 35 are rotatably mounted in suitable bushings 36 and 37 within which they are free to turn, and the shaft 30 is free to turn within the hollow shafts 34 and 35 except when it is clutched to one of the clutch members 31 and 32. Fixed upon the hollow shaft 35 is a spacing collar or guide 39, and fixed to said collar is a pinion 40 which meshes with a spur gear 41, the hub of which is loosely splined upon a hollow shaft which forms the elongated hub of the spur gear 42, the function of which will be hereinafter set forth. The spur gear 41 is also provided with an elongated hub and integral with this hub is another spur gear 43 of relatively small diameter. The gear 43 meshes with an intermediate transmission gear 44 which is rotatably mounted upon a stub shaft 45 carried by the frame 38. The gear 44 in turn meshes with the pinion 46 which is keyed or otherwise fixedly mounted upon the hollow shaft 34 which carries the clutch member 31. It will be seen from the foregoing description that the gears 41 and 43 are so arranged that they will slide back and forth upon the elongated hub to which they are splined as the slide 26 is reciprocated by the action of the cam slot 21 and the roller 22.

The shaft 30 is bored out at its forward end to receive a collet chuck 47 which is adapted to hold a threading tap 48.

The mechanism carried by the slide 26, being located above the main portion of the frame 1, is not housed thereby, but is protected by a sheet metal cover 49 which is attached to said slide by cap screws 50. Fixed upon one end of the shaft 12 is a spiral gear 51 meshing at right angles with a similar spiral gear 52 mounted upon a longitudinally extending shaft 53. The shaft 53 is journalled in bearings in bosses 54 which project laterally from the walls of the frame 1. The shaft 53 carries a gear 55 keyed or fixedly secured thereon which meshes with the gear 42. The clutch members 31 and 32 are, therefore, driven from the shaft 53 through the gears 55, 42, 41, 43, etc.

The gear 42 is mounted upon a pair of bushings 56 which are rotatable upon the shaft 17. It will be understood from the foregoing that the shaft 17 is permitted to rotate independently of the gear 42, the bushings 56 and the gears 41 and 43. The shaft thus performs the double function of a support for the gears 41 and 43 and a power shaft which drives the cylindrical cam 20 and other mechanism to be hereinafter described. Mounted upon the shaft 53 is a pair of burring mills 57 which straddle a disk 58 fixed upon a short shaft 59 and suitably housed as shown. The disk 58 is cut away, as at 70, for a purpose to be hereinafter described. A spur gear 60 fixed upon the short shaft 59 meshes with a spur gear 61 which is fixedly secured to a gear wheel 62 that is mounted to rotate with the shaft 17. The gear wheel 62 meshes with a pinion 63 which is keyed to the auxiliary shaft 10.

In the operation of the machine a quantity of nuts is placed in the hopper 2 and the mechanism is set in motion by means of the belt 14. The shaft 12, being rotated, turns the worm 15, the worm wheel 16, shaft 17, cylindrical cam 20 and gear wheel 62. The gear wheel 62 drives the pinion 63, thus rotating the shaft 10 whereby a vertical reciprocatory motion is imparted to the bars 3 to agitate the nuts in the hopper. By reason of this agitation the nuts will be shaken into the space between the bars 3 and will pass downwardly in the slot 5 until the lowermost nut in the series engages the face of the positioning stop 66. Concurrently with the operation outlined above the groove 21 of the rotating cylindrical cam 20 acts upon the roller 22, causing the block 23, shaft 24 and member 26 to move forwardly. At the same time the spiral gear 51 meshing with the gear 52 causes the latter and the shaft 53 to rotate. The gear 55 drives the gear 42, the latter in turn acting through the gear 41 to drive the gear 40 and thus rotate the clutch member 32 in a clockwise direction. The gear 43, being integral with the gear 41, rotates in the same direction, but the transmission gear 44, being disposed between the gear 43 and the gear 46, the gear 46 and the clutch member 31 are caused to rotate in a counterclockwise direction. The shaft 30 and the bevel faced clutch member 32 are normally idle, but when the slide 26 which carries this mechanism is moved forwardly by the roller 22 as acted upon by the groove 21 of the cylindrical cam 20, the threading tap 48 is brought into contact with one of the nuts, which has taken up a position in the slot 5 above the block 65. The longitudinal movement of the shaft 30 and the clutch member 33 is checked by the engagement of the threading tap with the nut, and upon continued forward movement of the slide 26 one beveled face of the clutch member 33 contacts with the conical face of the clutch member 32 which is rotating in a clockwise direction. The clutch member 33, shaft 30 and tap 48 are thus turned and the tap is threaded into the nut.

The block 23 and shaft 24 move forwardly a short distance after movement of the shaft 30, the clutch and the slide has been checked, thus compressing the springs 29. The expansive force of the springs thereafter exerts the necessary pressure on the threading tap to hold the nut in place and force the tap into the aperture. As the change in the direction of the slot 21 causes the roller 22 and shaft 24 to move rearwardly, this pressure decreases until at about the time the tap has been passed a sufficient distance through the nut the pressure is entirely relieved. The slide 26 and the clutch members 33 and 31 move rearwardly until the member 32 is disengaged from the bevel edged member 33 and the member 31 is engaged therewith. The shaft 30, clutch and slide 26 continue to move rearwardly with the roller 22, thus pulling the nut from its position in the lower end of the slot 5 into an adjacent passage 67. The rearward movement of the shaft 30 and the clutch and slide 26 is arrested by engagement of the nut with the rear face 68 of the passage 67 and the rear spring 29 is put under compression by the continued movement of the block 23 as actuated by the cam slot. By reason of the engagement of the clutch members 31 and 33 the shaft 30 is meanwhile being turned in a direction to unscrew the tap from the nut, and, as soon as the tap is free of the threads, the slide 26 and parts carried thereby move under the influence of the compressed spring 29 to completely withdraw the tap from the aperture in the nut, so that the nut is allowed to fall through a chute 69 into a recess 70 in the periphery of the disk 58. Rotation of the disk 58 carries the nut between the burring mills or cutters 57, thus removing any rough or burred edges which may have developed during the threading operation. By continued rotation of the disk 58 the nut is permitted to fall through an opening 71 in the housing 72 into any suitable receptacle (not shown). It will be understood that the slot 5 is kept filled so that it acts as a magazine, and as soon as one nut is moved from the position in which it is tapped another nut falls into its place, and the above described operation is repeated as often as desired.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, in combination, a magazine adapted to contain a row of articles to be tapped, there being a passage adjacent said magazine, a threading tool, means for moving said threading tool through said passage and into engagement with an article in said magazine, means for turning said threading tool, means for retracting said threading tool and thereby moving said article from said magazine into said passage, means for reversing the direction of rotation of said threading tool, and means for removing the burr due to the threading operation from said article.

2. In a device of the class described, in combination, a frame, a reciprocatory carrier mounted thereon, a pair of oppositely revolving clutch members carried by said carrier, an intermediate clutch member carried by said carrier, a threading tool connected to said intermediate clutch member, means for moving said carrier forwardly to bring said tool into engagement with an article to be threaded, the parts being so arranged that said intermediate clutch member is brought into engagement with one of said oppositely revolving clutch members when said tool engages the article to be threaded, and means for moving said carrier in the opposite direction, the parts being so arranged that the intermediate clutch member engages the other of said oppositely revolving clutch members when the carrier is moved to withdraw said tool from the article which has been threaded, said carrier moving means including a resilient lost motion connection.

3. In a device of the class described, in combination, a magazine adapted to contain a row of articles to be threaded, there being a passage adjacent said magazine, a reciprocatory carrier, a threading tool supported by said carrier, a pair of oppositely revolving clutch members carried by said carrier, an intermediate clutch member connected to said tool, means for moving said carrier forwardly to bring said threading tool into engagement with one of the articles in said magazine, the parts being so arranged that the intermediate clutch member is engaged with one of said oppositely revolving clutch members when said tool engages said article, and means operative after the threading operation to move said carrier rearwardly and thereby move said article from said magazine to said passage, the parts being so arranged that said intermediate clutch member is engaged with the other of said oppositely revolving clutch members when said article is moved into said passage.

4. In a device of the class described, in combination, a magazine adapted to contain a row of articles to be threaded, there being a passage adjacent said magazine, a reciprocatory carrier, a threading tool supported by said carrier, a pair of oppositely revolving clutch members carried by said carrier, an intermediate clutch member connected to said tool, means for moving said carrier forwardly to bring said threading tool into engagement with one of the articles in said magazine, the parts being so arranged that the intermediate clutch member is engaged with one of said oppositely revolving clutch members when said tool engages said article, means operative after the threading operation to move said carrier rearwardly and thereby move said article from said magazine to said passage, the parts being so arranged that said intermediate clutch member is engaged with the other of said oppositely revolving clutch members when said article is moved into said passage, and spring means interposed between said carrier moving means and said carrier to form a resilient lost motion connection.

HARRY S. BERGEN.